United States Patent Office 2,842,326
Patented July 8, 1958

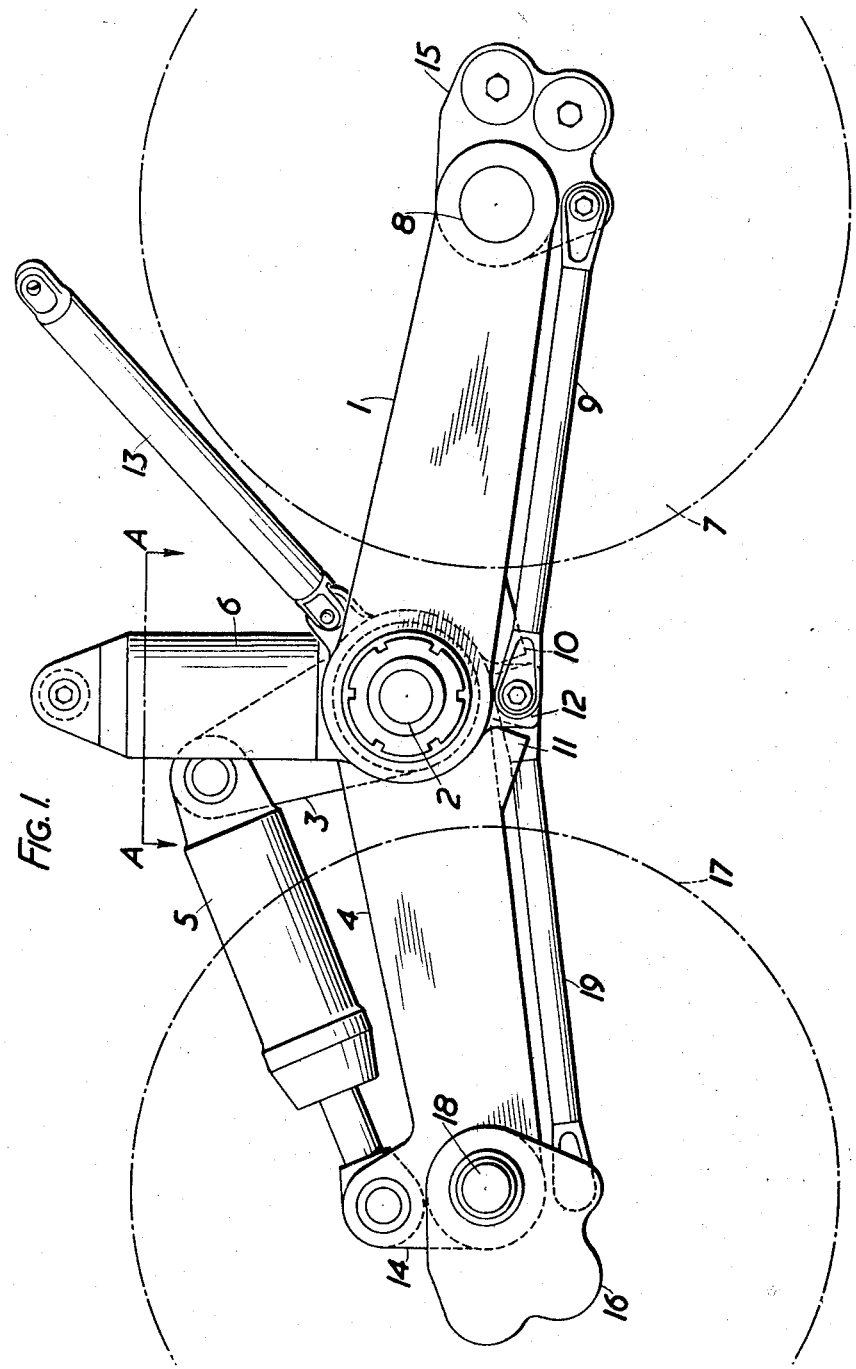

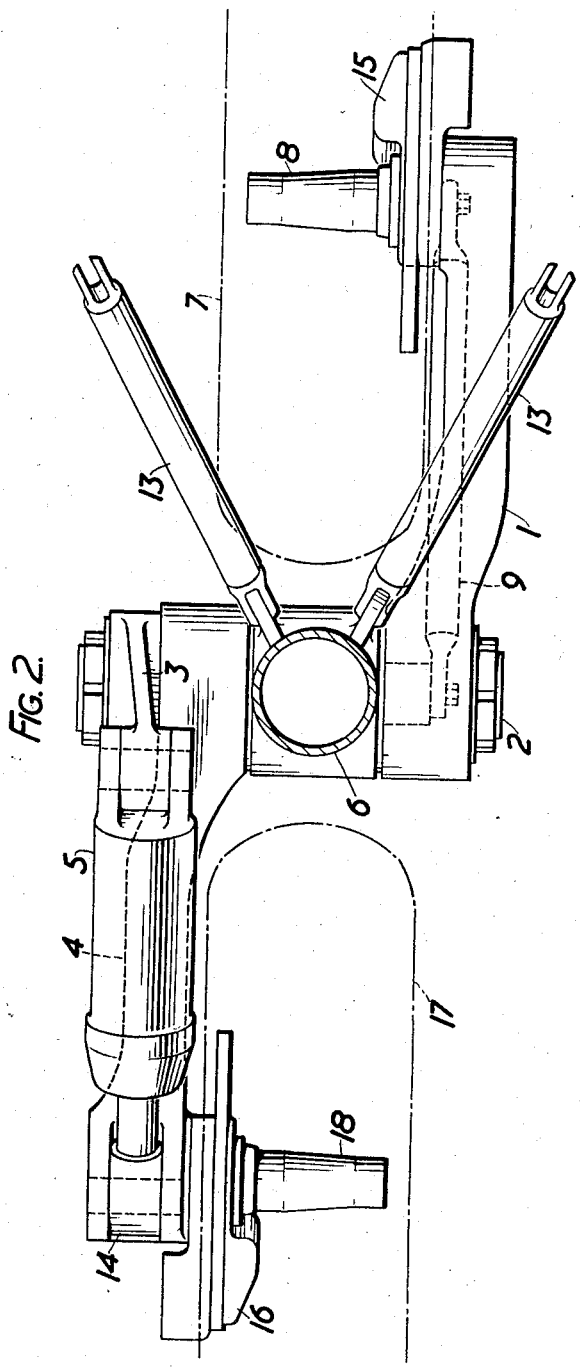

2,842,326
AIRCRAFT UNDERCARRIAGE

Geoffrey Francis Sharples, Blackpool, England, assignor to The English Electric Company Limited, London, England, a British company Application January 21, 1955, Serial No. 483,316

Claims priority, application Great Britain March 23, 1954

4 Claims. (Cl. 244—103)

The invention relates to aircraft undercarriages of the tandem type in which two wheels are arranged on the same track on each leg of the undercarriage.

According to the present invention two arms, each carrying at its free end a stub axle for a wheel, are pivoted independently of one another at opposite sides of the leg parallel to the said stub axles which are pointing in opposite directions so as to bring the centre planes of the two wheels into alignment with one another. The swinging of the said arms about said common axle is reacted to by a shock absorber linked between the said arms.

Preferably the said arms are mounted on a common axle fitted into a single common support which is attached to and braced against the aircraft structure. This support conveniently has a downward projection forming an abutment for stops arranged on each arm limiting the downward swinging movement of each arm. This projection may also form an attachment point for torque reaction rods connecting the brake pressure plates of the two wheels to the said support.

In order that the invention may be clearly understood and readily carried into effect, an embodiment of it will now be described by way of example with reference to the accompanying drawing, in which:

Fig. 1 is a lateral elevation, and

Fig. 2 is a plan view in section along the line A—A of Fig. 1, of a non-retractable undercarriage leg.

A rear arm 1 is keyed to an axle 2, which is pivoted at the lower end of a short strut 6 and on which a forward arm 4 is pivoted. The two arms 1 and 4 are arranged on opposite sides of the said strut 6 so as to form in plan view a letter Z-formation as seen in Fig. 2.

A stub axle 8, 18, respectively, is arranged parallel to the axle 2 at the free end of the arms 1, 4, respectively, pointing in opposite directions so as to bring the centre planes of the two wheels 7, 17, respectively, journalled on them, into alignment as shown in Fig. 2.

A one-armed lever 3 is also keyed to the axle 2 on the opposite side of the arm 1, and a telescopic shock absorber 5 is linked between the end of said lever 3 and a lug 14 at the free end of said forward arm 4. A projection 12 extends downward from the said strut 6 and serves as an abutment for the stops 10 and 11 arranged at the undersides and near the inner ends of the arms 1 and 4, respectively, limiting their downward movement. Brake pressure plates 15, 16 are pivotally mounted on the said axles 8, 18, respectively.

The said projection 12 serves also as an attachment for the torque reaction rods 9 and 19, connecting the brake pressure plates 15 and 16, respectively, of the wheels 7 and 17, respectively, to the said strut 6.

The strut 6 is attached at its upper end to the aircraft structure (not shown) and braced against the same at its lower end by two diverging tie rods 13.

In normal operation, i. e. while taxi-ing or during the take-off run and after landing, both wheels 7, 17 swing in opposite directions about the common axis of the axle 2, their movements being reacted to by the shock absorber 5, and the forces are transmitted to the aircraft structure through the strut 6 and tie rods 13.

While the aircraft is airborne, the two arms 1 and 4 are prevented from dropping down by their stops 10 and 11, respectively, abutting on the projection 12 at the lower end of the strut 6. This ensures also that when landing in the usual nose-up attitude the rear wheel 7 touches the ground first, the front wheel 17 being prevented by the said stop 11 from slamming down owing to its linkage 14—5—3 to the arm 1, when the rear wheel 7 touches down. Moreover, in the case of a tyre burst of the rear wheel the full load can be taken by the front wheel, the rear arm 1 then abutting with its stop 10 on the projection 12.

The arrangement as described has the further advantages that during normal running the bending moments on the strut 6 caused by the loads on the front and rear wheel cancel out, and that it allows the use of interchangeable front and rear wheels. The complete unit of an undercarriage leg can be removed after removal of the bolts connecting the strut 6 and the tie rods 13 to the aircraft structure.

While the principle of the invention has been described hereinabove with reference to the embodiment illustrated of a fixed, non-retractable undercarriage leg, the invention should be likewise applied to retractable undercarriages.

What I claim as my invention and desire to secure by Letters Patent, is:

1. An aircraft undercarriage of the tandem type comprising in combination: an undercarriage leg, a common axle journalled in the said leg, one arm fixedly connected to one end of the said axle and a second arm rotatably mounted on the other end of the said axle, stub axles mounted on the free ends of the said arms parallel to the said common axle of the latter and pointing in opposite directions, and wheels journalled on the said stub axles and having their centre planes in alignment with one another.

2. An aircraft undercarriage as claimed in claim 1, wherein the said leg has a downward projection, and the said arms have stops abutting on the said projection so as to limit the downward swinging movement of each arm.

3. An aircraft single track two-wheel asymmetrical undercarriage of the tandem type comprising in combination: an undercarriage leg, two arms pivoted independently of one another on the said leg laterally on opposite sides of the said leg, a shock absorber operatively linked between the said two arms and stub axles mounted on the free ends of the said arms parallel to the pivot axes of the latter and pointing in opposite directions, each axle having one wheel journalled thereon, the said wheels having their centre planes in alignment with one another.

4. An aircraft undercarriage as claimed in claim 3 comprising an axle pivotally mounted in the lower end of said leg, one of the said arms being fixedly mounted and the other one being rotatably mounted on said axle, a short lever fixedly mounted on the said axle adjacent the said rotatably mounted arm the said shock absorber being articulated between the said lever and said rotatably mounted arm alongside the latter, an abutment arranged at the lower end of the said leg, the downward swinging of the said arms being limited by the said shock absorber resiliently forcing the said arms against the said abutment.

References Cited in the file of this patent

UNITED STATES PATENTS

| | | |
|---|---|---|
| 2,072,787 | Anderson | Mar. 2, 1937 |
| 2,533,607 | Neilson | Dec. 12, 1950 |
| 2,578,200 | Nicholl | Dec. 11, 1951 |
| 2,579,180 | Eldred | Dec. 18, 1951 |
| 2,699,302 | Whitaker | Jan. 11, 1955 |